United States Patent [19]

Lofgren et al.

[11] Patent Number: 4,809,088

[45] Date of Patent: Feb. 28, 1989

[54] INTEGRATED SYSTEM FOR IMPLEMENTATION OF READ WINDOW MARGINING AND WRITE PRECOMPENSATON IN DISK DRIVES

[75] Inventors: Karl M. J. Lofgren, Long Beach; Ronald E. Wilson, Lake Forest, both of Calif.

[73] Assignee: Western Digital Corporation, Irvine, Calif.

[21] Appl. No.: 938,529

[22] Filed: Dec. 5, 1986

[51] Int. Cl.$^4$ .......................... G11B 27/36; G11B 5/09
[52] U.S. Cl. ........................................ 360/31; 360/45; 360/31
[58] Field of Search ................... 360/31, 45, 46, 51; 324/212

[56] References Cited

U.S. PATENT DOCUMENTS

4,612,586  9/1986  Sordello ................................ 360/31
4,641,207  2/1987  Green et al. ........................ 360/31

Primary Examiner—Vincent P. Canney
Attorney, Agent, or Firm—Spensley Horn Jubas & Lubitz

[57] ABSTRACT

An integrated system for use in a disk drive system for the implementation of write precompensation for recording of data and read window margining for accelerated testing of the disk drive. Both functions are provided by a common delay-line circuitry. The output of the delay line circuit is applied to both window shifting and write precompensation. An on-board read detection error analysis can be performed after installation of the drive in a computer system in its final configuration. Actual read error tolerance based on the overall system in its actual operating condition can thus be obtained. Enhanced data recovery techniques are also facilitated.

12 Claims, 7 Drawing Sheets

INTEGRATED SYSTEM FOR IMPLEMENTATION OF READ WINDOW MARGINING AND WRITE PRECOMPENSATON IN DISK DRIVES

BACKGROUND OF THE INVENTION

1. Field of the Invention

The present invention relates to an integrated system for reading and writing information on magnetic recording media and more particularly to the implementation of read window margining and write precompensation in a magnetic disk drive controller system. Still, more particularly, the present invention is directed to an integrated system implemented in a final configuration computer system in which the dual functions of accelerated testing of the system to determine error rate and precompensation of write data can be performed with the same integrated hardware.

Figure 1A:
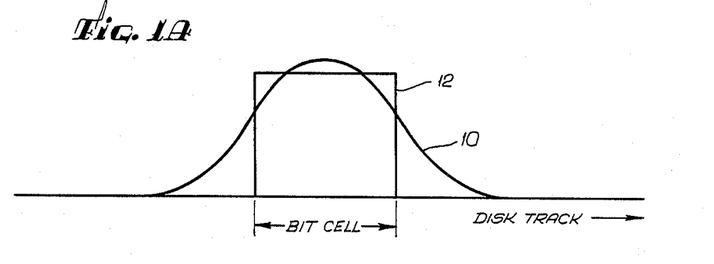
FIGS. 1A and 1B are diagrams illustrating peak shift.
Figure 1B:
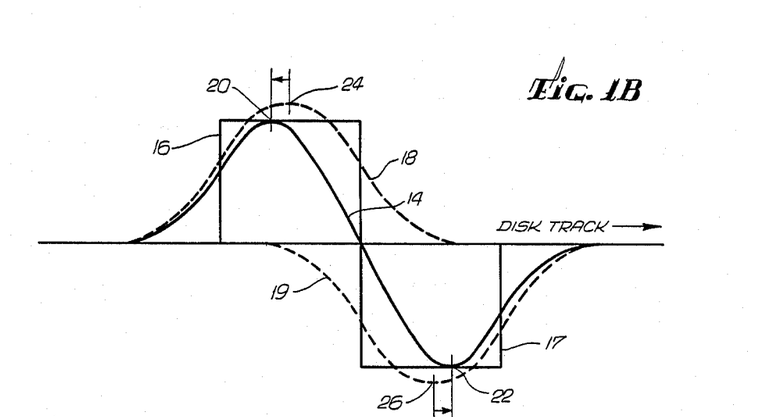

In recording, magnetic dipoles contained in the disk medium move past a recording head, which consists of an electromagnet with highly focused fringing field. The magnetic field due to the recording head current aligns the dipoles in one direction or another representing digital bits (logic 1's and 0's). Each bit occupies one bit cell. The magnetic field of the magnetic head extends somewhat over several bit locations. As shown FIG. 1A, the magnetization 10 of a track of the disk is shown as a function of position along the track, for a sharp rectangular pulse 12 of record head current. The resultant magnetization 14 due to adjacent record head current pulses 16 and 17 of opposite polarity is shown in FIG. 1B, from which it is seen that the overlap of the magnetization 18 and 19 due to the respective pulses 16 and 17 causes the adjacent magnetization peaks 20 and 22 of opposite polarity to be shifted from their respective center positions 24 and 26. This shifting due to interaction of neighboring bits is referred to as "peak shift". The amount of peak shift is greatest on the inner disk tracks, where bit spacing is smallest. To eliminate the effects of peak shift in subsequent data recovery, the write data is typically precompensated during the record process for peak shift, by judiciously advancing or delaying the write signal depending on the data pattern and the track radius. This process is referred to as "write precompensation".

A data signal is normally recorded on magnetic disks in encoded form consisting of data information as well as synchronous clock information of the rate at which the digital bits are written onto the disk. Ideally, the clock rate of data is a known fixed value. Due to various factors, however, such is not the case, and the clock rate of the data must be determined by looking at the data signal itself in order to accurately read the data from the disk. The encoded clock information is employed in the data recovery process to accurately determine the data rate when signals for the disk are being read.

Figure 2:
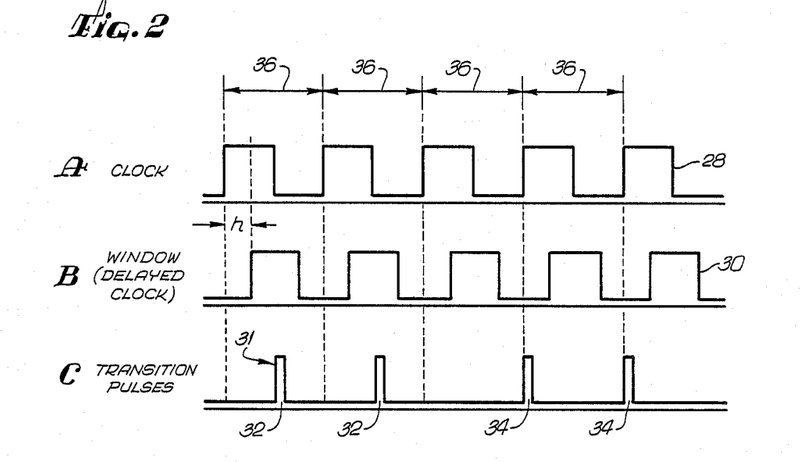

During recovery of recorded data signal, the clock information is first recovered from the encoded data signal by a data separator. It is the transitions from logic 1 to 0 or vice versa at the boundary between bit cells, not the sense of the digital bits, that are essential to decoding. Referring to FIG. 2, typically, the signal recovered from a disk read is used to form narrow pulses 32, 34 wherein the rising edge 31 of each pulse corresponds to each transition, i.e. transition pulses which represent either data pulses 32 or clock pulses 34. A phase-locked loop driven by the transition pulses provides a recovered clock signal 28 which is equal to the clock rate of the data being read. The clock signal defines the bit cells 36. A read window signal 30 is generated based upon the recovered clock to distinguish the data pulses occurring near the center of bit cells from the clock pulses occurring near the edge of bit cells. In this fashion the data information can be separated from the clock information. Typically, the window signal is obtained by delaying the clock signal by h, a quarter of the clock period. This delay is often referred to as a "half window" delay. A commonly used data format is modified frequency modulation (MFM) format. The encoding and decoding sequence of this format is described in detail in copending U.S. patent application Ser. No. 803,664 filed on Dec. 2, 1985 and assigned to the same assignee as the present invention.

Figure 3:
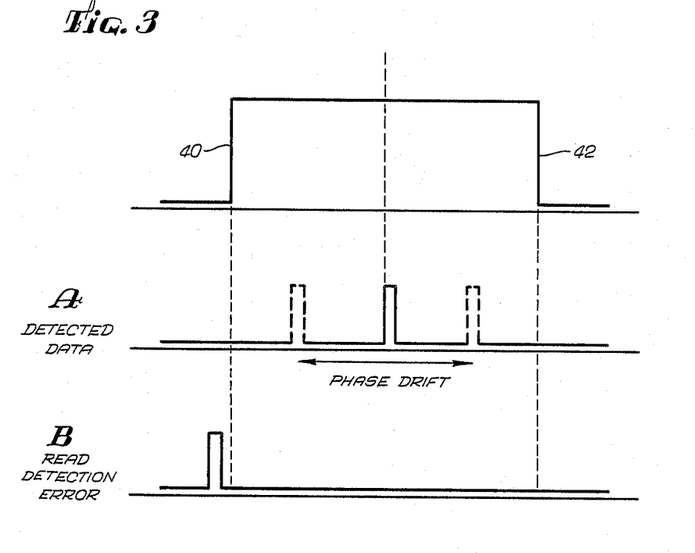

A data detector utilizes the read window signal to detect data pulses falling near the center of each bit cell. Under ideal conditions, the read window signal is in phase with the transition pulses generated from the recovered data signal from the disk such that each data pulse is located at the center of the window. However, when the data signal is exposed to interference in pulse timing, the transition pulses move away from the center of the read window due to a shift in phase, as illustrated in FIG. 3A. Pulse timing may fluctuate due to a number of factors, including magnetic surface flatness variations, variations in uniformity of the magnetic properties of the media, speed variations, wow and flutter, uncompensated second order peak shift effects, imperfect peak shift compensation, deep magnetization of the media, interference from magnetic patterns on adjacent tracks, incomplete erasure of previous recordings, magnetic noise, and electrical noise. If a transition pulse is shifted so much that it moves outside the edges 40 and 42 of the read window, as shown in FIG. 3B, that pulse will not be detected properly, thus giving rise to a read error. The read window thus defines the boundaries within which transition pulses corresponding to data can be properly detected even when there is drift in phase of the pulses.

Figure 4:
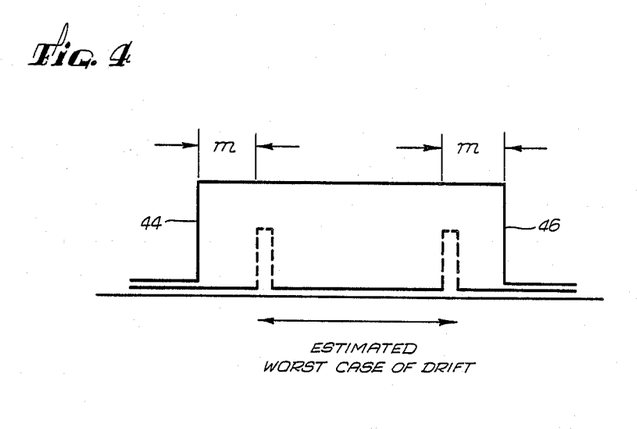
FIG. 4 is a diagram illustrating read window margin.

Aside from removing the above-mentioned causes of transition timing problem, one method of preventing read errors is to increase the width of the read window within practical considerations. It is therefore desirable to evaluate the performance of a disk drive read function by estimating the error rate for a particular read window size. It is useful to find out the probable worst case of drift of transition pulse within the read window. Referring to FIG. 4, the time difference m between the boundaries 44 and 46 of the read window and the predicted worst case of drift of the transition pulse is the "read window margin". Read window margin is a valuable criterion in evaluating the performance of a digital magnetic recording system.

2. Description of the Prior Art

Figure 5A:
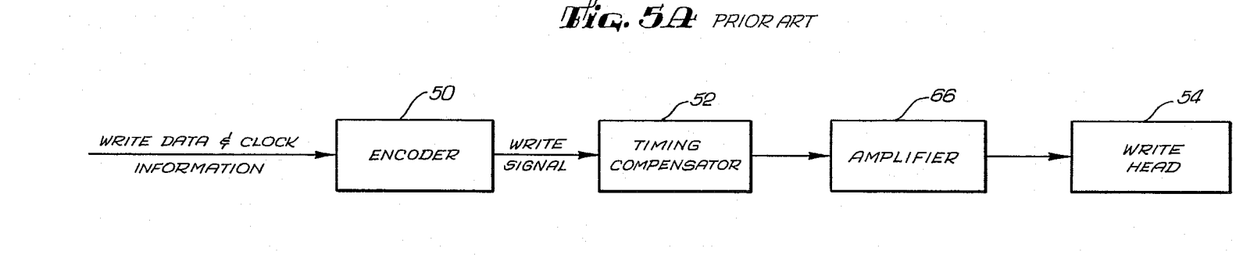
FIGS. 5A and B are block diagrams of typical disk record electronics.
Figure 5B:
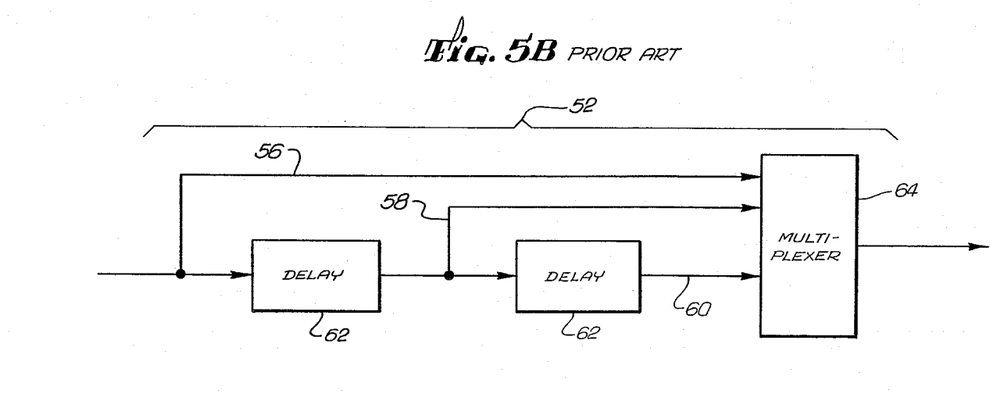

Typical disk record electronics providing for write precompensation function are shown in FIGS. 5A and 5B. The data pulses and clock pulses are encoded by an encoder 50 into a combined write signal. Referring to FIG. 5A, during write precompensation for peak shift, the phase of the write signal is shifted by a timing compensator 52 provided between the encoder 50 and a write head 54. A typical timing compensator is illustrated in FIG. 5B and includes three phase shifted signal lines 56, 58 and 60 representing early, normal and late write signals respectively from an array of delay-lines 62. A multiplexer 64 is employed to advance or delay the write data by selectively passing one of the phase shifted signals to the write head 54. Thus, the write signal is precompensated during the write process for peak shift by judiciously advancing and delaying the write signal as appropriate. On data recovery, the effect due to peak shift is thus reduced.

Figure 6:
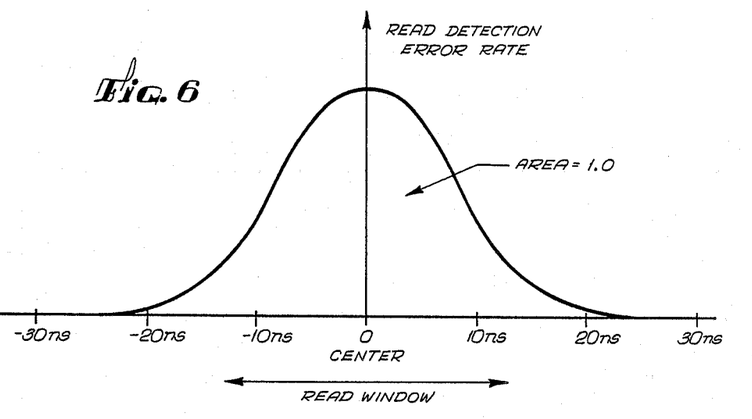
FIG. 6 is a graph illustrating a read error probability density function.
Figure 7:
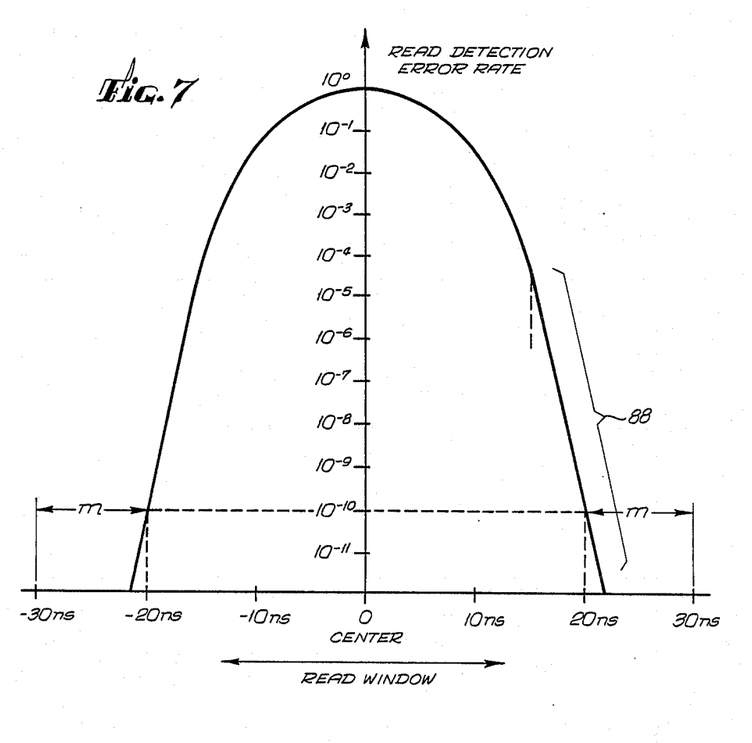
FIG. 7 is a graph illustrating a read error probability density function plotted on a logarithmic scale.

In the data recovery process, a common technique employed to study error rate is window margining analysis. Error rate is defined as the number of data pulses read before one detection error is encountered. For example, a $10^{-10}$ error rate means that on average one error will occur every $10^{10}$ pulses. If one measures timing errors with respect to different window sizes, the major component of the result typically corresponds to a guassian (or normal) distribution which may be represented by a probability density function 86 as shown in FIG. 6. For the purpose of margin analysis, it is more appropriate to present the probability density function on a logarithmic scale. Referring to FIG. 7, which shows a typical read detection error probability density function of a disk drive, the vertical axis represents error rate in logarithmic scale. In this particular example, the graph indicates that given a window size of 40 ns, a read error will occur in every $10^{10}$ transition pulses read on average. In other words, once in every $10^{10}$ transition pulses, a pulse will actually be read more than 20 ns away from the center of the window on one side. That is to say that a disk drive with this probability density function and a $10^{-10}$ error rate will be required to tolerate at least 20 ns of phase drift of the pulse from its nominal center position. If instead a window size of 60 ns is employed, there will be a read window margin of $m=10$ ns on each side of the window for a drive with a $10^{-10}$ error specification.

It is noted in FIG. 7 that beyond about 30 ns in window width (plus or minus 15 ns from the center of the window), there is expected a linear relation between window width and logarithmic error, as shown in region 88 of the graph. Thus, it is possible to deduce the error rate beyond window width of 30 ns from several measurements in the linear portion of the graph and then by extrapolation of the data. This is extremely useful because at low error rates, it is very time consuming to measure one occurrence of error in every $10^{10}$ pulses, for example, several times to obtain a meaningful average and to repeat the process for each increment of window size.

Figure 8:
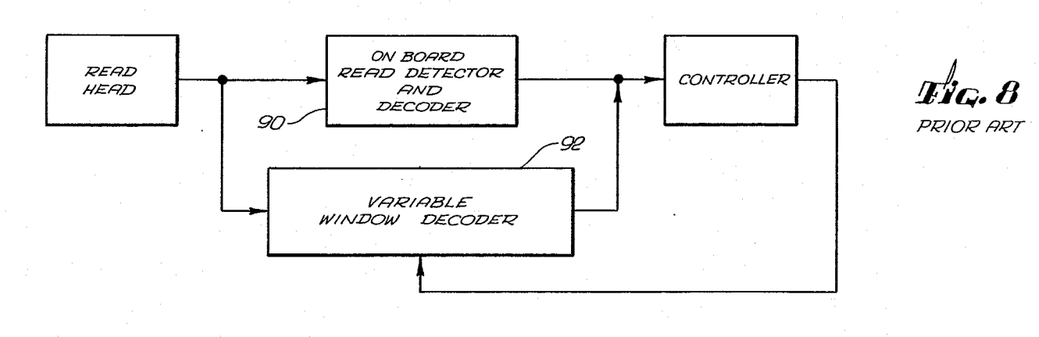
FIG. 8 is a block diagram illustrating an arrangement for testing of disk drives.

In practice, an external off-line test instrument dedicated to the purpose of window margin analysis is employed to analyze the read error performance of a disk drive system. Referring to FIG. 8, the test instrument is commonly connected to the disk drive system in a configuration such as to by-pass the on-board data detector 90. The test instrument includes a dedicated variable window decoder 92 which typically has a delay-line and a PLL system (not shown) incorporated in its circuit to selectively shift the phase of the window signal relative to the nominal position of the transition pulse signal. The transition pulses detected will therefore be closer to the edge of the window which was shifted toward the nominal position of the transition pulse signal. By shifting the window, the error rate is artificially increased since effectively the window width is decreased and the pulse is more likely to drift beyond the window edge. By shifting the window in increments and measuring an average read error rate each time, it is possible to generate a read error rate probability distribution plot similar to the one in FIG. 7, and extrapolate the plot to determine the system error rate in the absence of artificial window shifting, in much less time than would be required if no shift were employed.

In practice, disk drive manufacturers test the disk drives in relatively clean and electrically noise-free environments. The test equipment comprising a variable window decoder is complicated and expensive in order to achieve such test conditions. Thus, it is uneconomical for a manufacturer to tieup test equipment time for the testing of relatively inexpensive disk drives such as floppy disk drives commonly used in personal computers. It is clearly not feasible for end-users to maintain such expensive equipments. Another disadvantage of using an external test equipment is that the on-board normal data detector is not being used during the testing, which means that any imperfections in it are not being tested. Furthermore, the circuitry that is used in the test equipment may introduce its own imperfections. For example, it is possible that in the variable window decoder, its window sliding function interferes with the operation of its PLL. Moreover, the environment in which a disk drive is tested by the manufacturer is different from that in which the drive is actually put in service. The read window margin observed in a manufacturer's test bench can be substantially eroded by factors over which disk drive manufacturers have little control once a drive leaves a manufacturing plant. For example, in the final computer configuration, the presence of extraneous electrical noise from other hardware components such as disk controller, switching power supply, printer, monitor, keyboard and the like, coupled with a poor on-board decoder can reduce the read window margin compared to the value obtained in a drive acceptance test.

SUMMARY OF THE INVENTION

The present invention is directed to an integrated system for use in a disk drive controller which includes delay-line circuitry which can be switched into the system so as to provide (a) window margin (shifting) to facilitate accelerated testing of a disk drive in its actual operating configuration, or (b) write precompensation during the recording of data. Encoded read and write data pulses are directed to the delay-line circuitry which includes a variable delay, the output of which is connected to both a write head in the disk drive and a read data detector. The write and read function is selected by means of a control system which also determines the correct amount of precompensation to be applied during write function, and the amount of phase shift of the data pulses relative to the window edges during the read window margining function. During the normal read operation of the disk drive, the control system by-passes the delay-line circuitry to eliminate any read window shift.

Since the delay-line circuitry in most part is otherwise already implemented to provide write precompensation, the addition of the read window margining function can be implemented with very little cost. The integrated read window margining function permits testing of read detection error specification of a new drive in a final computer configuration without introducing noise otherwise introduced by external test equipment. The test may be performed in a simple manner by the end user. Furthermore, it is possible to diagnose the source of read error in the final configuration. Recovery of lost (mistimed pulses) data due to data detection error is also possible.

BRIEF DESCRIPTION OF THE DRAWINGS

The invention will be discussed with reference to the accompanying drawings, wherein:

FIGS. 2A, B and C are expanded waveform diagrams illustrating the relationship between a data stream and a read window signal;

FIGS. 3A and B are diagrams illustrating phase drift of the transition pulses;

DESCRIPTION OF THE PREFERRED EMBODIMENT

The following detailed description is of the best presently contemplated mode of carrying out the invention. This description is made for the purpose of illustrating the general principles of the invention and is not to be taken in a limiting sense. The scope of the invention is best determined by reference to the appended claims.

Figure 9:
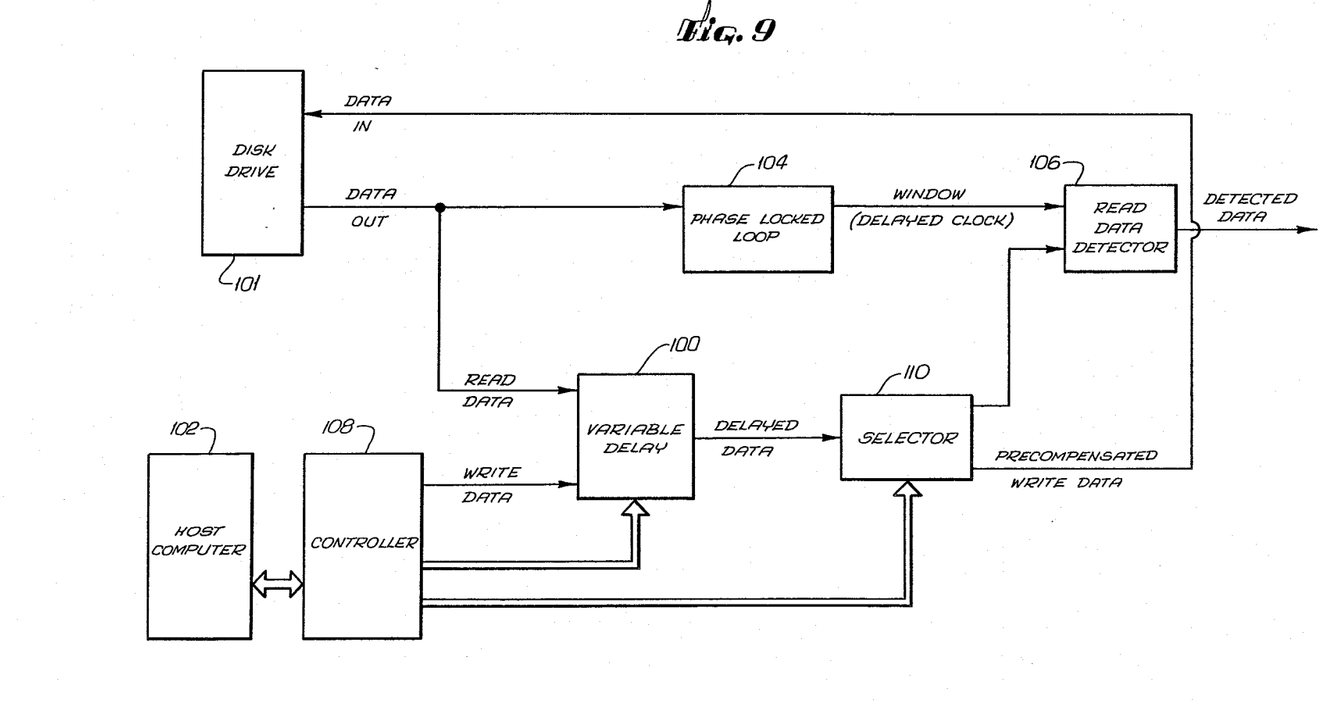
FIG. 9 is a block diagram of the present invention.

Referring to FIG. 9, in the system of the present invention, a variable delay-line system 100 receives an input signal of encoded transition pulses of either read information from a disk drive 101 or write information from a host computer 102 via controller circuitry 108. The variable delay-line system 100 is capable of shifting the phase of the input signal by different amounts. The amount of phase shift is determined by the controller 108 operating in conjunction with the host computer 102. The output of the variable delay-line system 100 is connected to a selector 110 which directs the incoming signal to either a write head (not shown) in the disk drive 101 if the incoming signal is a write signal or a read data detector 106 if the incoming signal is a read signal. The selector 110 may be controlled by the same controller 108.

During the writing of data, the variable delay 100 is employed to provide write precompensation for any peak shift of the data due to magnetic interaction of magnetic dipoles in the disk medium. The controller 108 determines the amount of the phase shift of the encoded write data from the host computer 102, which depends on the bit spacing and the track on which data is to be written onto the disk. The phase shift could be an advance, a delay, or no shift at all. The precompensated write data is transmitted via the switching device 110 to the write head of the disk drive.

During normal reading of data not in a disk drive test mode, window shifting is not performed. The delay-line system 100 does not change the phase of the incoming signal relative to the window signal. The encoded read data signal from the disk drive, which is in the form of pulses corresponding to transitions in the recorded signal detected by the read head of the disk drive, is directed to the read data detector 106 via the selector 110.

The read data signal is also applied to a phase detector (not shown) in a PLL system 104. The PLL system 104 generates at its output a window signal from the clock information recovered from the data transition pulses. The window signal is also applied to the read data detector 106. The read data detector 106 determines whether a transition pulse is detected within a read window. It may incorporate a latch circuit such as a J-K flip-flop that is well known in the art. Nominally, the read window is centered about each transition pulse. If a transition pulse falls within the edges of the window, the pulse is applied to, for example, the controller 108 which communicates with the host computer. If a transition pulse falls outside the edges, it will not be detected, i.e., a "lost" data, thus giving rise to an error in the information read.

Figure 10:
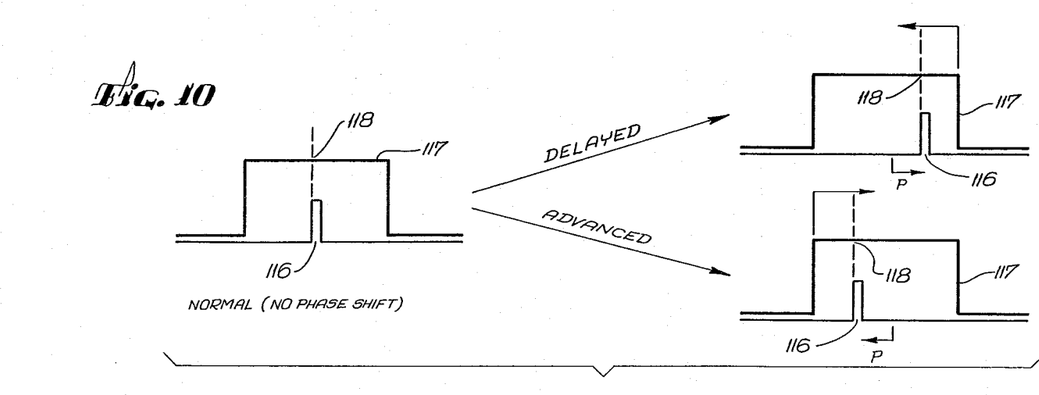
FIG. 10 is a diagram illustrating shifting of the read window.

During the testing of the disk drive 101, the delay line system 100 is controlled to provide window shifting for margining analysis. Nominally without window shifting, the read window is centered about the transition pulses which represents data information. With window shifting, the phase of all of the data pulses is shifted a predetermined amount by the delay-line system 100. Referring to FIG. 10, it can be seen that the phase shift of the data pulse 116 in effect results in the sliding of the read window 117 toward the nominal center position 118 of the pulse 116. The phase shift can be either a delay or an advance corresponding to the sliding of the right and the left edge of the read window respectively toward the pulse 116. By appropriately controlling the amount of phase shift using the variable delay-line system, the read window is effectively narrowed and an error rate plot such as FIG. 7 can be obtained.

The read window margining function can be applied after the disk drive has been installed in a computer system in a final configuration. This enables the customer to test a manufacturer's error specification before putting the device in service. More importantly, it is desirable to the end-users to determine the actual read window margin of the overall read function of the final system by accounting for signal noise induced for example by associated hardware. It is to be noted that since the delay-line does not shift the read data signal that is going into to the PLL system, but shifts only the data signal from the variable delay which is going into the read data detector 106, any side effect due to the window shifting function on the PLL system is eliminated. In the situation when an error is detected after the drive is put in service, it is possible to determine the location of the defect or to perform an on-site system diagnosis without having to move the device away from its service location. Remedial action may then be appropriately taken. It is possible to recapture lost data that fell outside the window edges by sliding the window as part of an error recovery scheme. For example, if a read error continues to exist after several retries, the window may be shifted early and then shifted late by delaying and advancing respectively the phase of the transition pulse signal. Since the probability of a pulse being outside the window is small compared to the number of pulses in a read operation, thee is a strong probability that a read error was due to a single pulse. Therefore, repeating the read operation with the window shifted in one direction, and then the other, is very likely to be error-free. This in effect temporarily increases the read window size.

Figure 11:
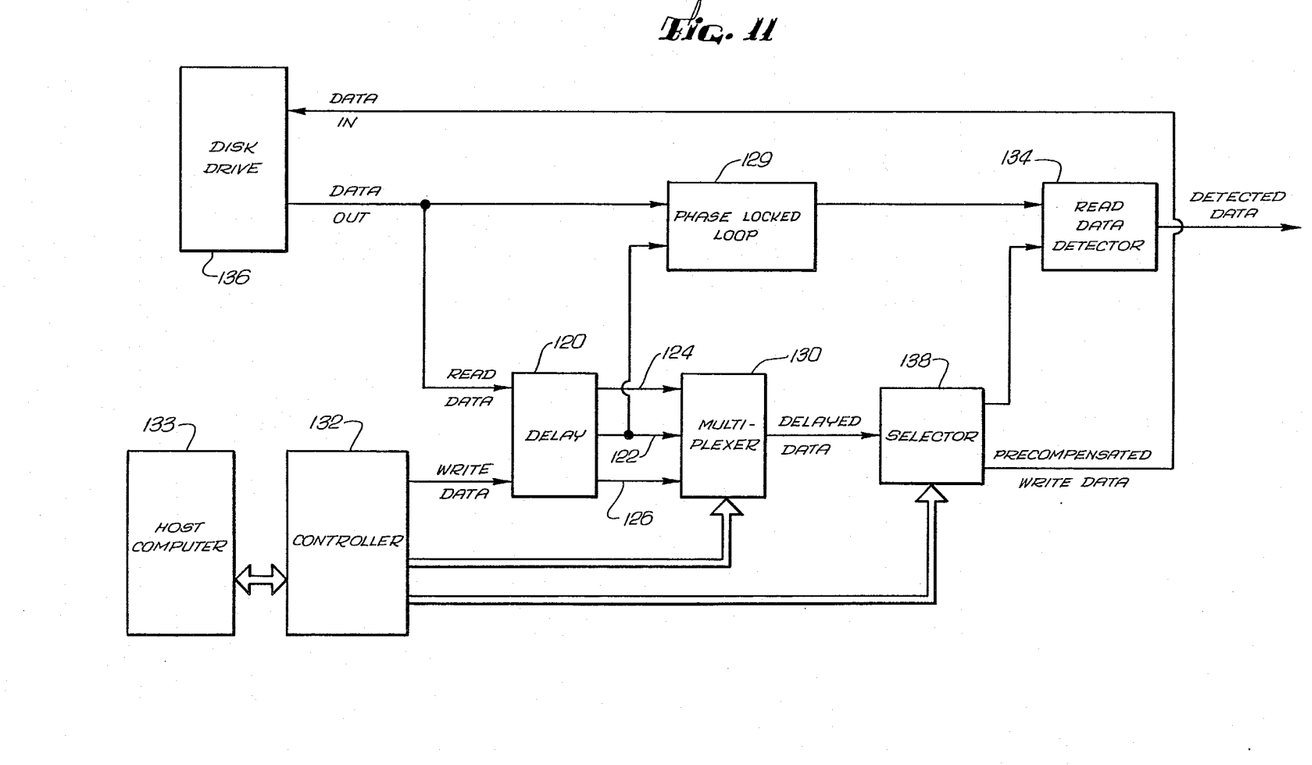
FIG. 11, is a block diagram of another embodiment of the present invention.

FIG. 11 shows an alternate embodiment of a delay-line system for use in a system of the present invention.

In this embodiment, the delay-line system also provides the necessary delay for generating the window signal from the recovered clock signal. The delay-line system comprises a delay 120 which has multiple delay outputs each corresponding to a signal having a phase shifted by a predetermined amount with respect to its input which is the read data signal from the disk drive to the delay-line system. For simplicity, this embodiment is described as having three delayed outputs. One of the delayed outputs, preferably the center output 122, has a phase shifted by h (see FIG. 2), corresponding to half a read window width, with respect to the input read data signal. The left and right (as viewed in the direction of the signal path) delayed outputs 124 and 126 have a phase shift of, for example, plus or minus 12 ns respectively with respect to the center delayed output. A multiplexer 130 receives all three delayed signals as inputs from the delay 120. The multiplexer 130 allows passage of one of the inputs as determined by a controller 132 operating in conjunction with a host computer 133. The output of the multiplexer 130 is applied to either a read data detector 134 or a write head of disk drive 136, depending on whether the signal transmitted is read signal or write signal, via a selector 138.

In this embodiment, during the writing of data, the multiplexer 130 is controlled to provide write precompensation by directing either the advanced or delayed write signal (with respect to the center delayed signal 122) to the write head. When no precompensation is desired, the center delayed signal 122 is used.

During normal reading of data not in a test mode, there is no window shifting. The multiplexer 130 and the selector 138 direct the center delayed signal 122 to the data detector 134. The center delayed signal 122 is also applied to a PLL system 129 to cause the clock pulses in the read data signal to be delayed by half a window width with respect to signal 122, which is a delayed read data signal, to generate the read window signal. The window signal is utilized by the read data detector 134 to detect the data pulses in the signal 22.

During the testing of disk drives, the delay 120 is employed to provide read window shifting. Nominally without window shifting, the read window is centered about the transition pulses of signal 122. With window shifting, the read data signal is phase shifted with respect to the signal 122. The delayed or advanced read data signal relative to the center delayed signal 122 is applied to the data detector 134 by means of the multiplexer 130. The edge of the window is effectively shifted either to the right or the left respectively by, for example, 12 ns with respect to the nominal center position of the pulses in signal 122. The read window is effectively narrowed on one side and extended on the other. Although the phase shift in either direction is fixed at 12 ns, it provides a good indication of the window margin in the margin analysis since the probability density function curve is steep and is linear in the regions approaching the edges of the read window. A disk drive controller system that qualifies under a margin analysis conducted utilizing a 12 ns window shift in either direction is deemed to possess a comfortable read operating margin.

In summary, the present invention provides an integrated system for use in a disk drive controller which includes a common delay-line circuitry to provide both write precompensation function and read window margining function. The delay-line of the system provides the appropriate phase shift of write signal for precompensation of write data and phase shift of read data for window shifting. The read window margining function provides an accelerated analysis of read error probability. The system is useful in determining the actually read error specification of the drive in the condition in which it is actually used in service. The system also provides useful diagnostic and recovery functions.

Although the invention has been described with reference to magnetic storage devices, the invention is also applicable to other forms of storage devices and their associated means of storing and retreiving information. For example, a storage device employing optical means for storing and/or retreiving information may be implemented with the novel features of this invention.

While the invention has been described with respect to the preferred embodiments in accordance therewith, it will be apparent to those skilled in the art that various modifications and improvements may be made without departing from the scope and spirit of the invention.

Accordingly, it is to be understood that the invention is not to be limited by the specific illustrative embodiment, but only by the scope of the appended claims.

I claim:

1. An integrated system for implementation of read window shifting and write precompensation functions in connection with a storage device such as a disk drive, comprising:
   supply means for providing write information;
   reading means for receiving read information from a recording medium in the storage device;
   phase shift means, coupled to said supply means and said reading means, for selectively receiving as an input signal read information from the reading means during read window shifting or write information from the supply means during write precompensation, and for generating an output signal having a different phase relative to the phase of the input signal;
   writing means for receiving the output signal of the phase shift means and for providing write information carried in the output signal to the storage device;
   read detection means for receiving the output signal of the phase shift means and for detecting read information carried in the output signal; and
   control means for selectively directing the write information in the output signal of the phase shift means to the writing means and the read information in the output signal to the read detection means.

2. A system according to claim 1, wherein the phase shift means comprises variable means for varying the amount of phase relationship between the input signal and the output signal; and a phase control means for determining the amount of phase shift desired and for controlling the variable means accordingly.

3. A system according to claim 2, further comprising window generation means for generating a read window signal having a predetermined phase relationship to the input signal of the phase shift means, the read window signal is applied to the read detection means.

4. A system according to claim 3, wherein the phase of the read window signal is delayed by half a window relative to the input signal of the phase shift means.

5. A system according to claim 1, wherein the phase shift means comprises means for generating a plurality of phase shifted signals each having a predetermined phase relationship to the input signal; selection means for receiving the phase shifted signals and for selecting one of the phase shifted signals as the output of the phase shift means; selection control means for controlling the selection means to select one of the phase shifted signals.

6. A system according to claim 5, further comprising window generation means for generating a read window signal having a phase delayed by a predetermined amount relative to the input signal of the phase shift means, the read window signal is applied to the read detection means.

7. A system according to claim 6, wherein the phase of one of the phase shifted signals is delayed by half a window to provide a half-window delay signal and wherein the phases of the remaining phase shifted signals are shifted relative to the half-window delay signal, the half-window delay signal being applied to the window generation means.

8. A system according to claim 4 or 7, wherein the window generation means includes a phase-locked loop system.

9. A system according to claim 8, wherein the read detection means comprises a latch circuitry.

10. A disk storage device having built-in read window shifting function in addition to write precompensation function comprising:
   a recording medium;
   reading means for detecting within a read window read data pulses recovered from the recording medium;
   writing means for writing write data pulses onto the recording medium;
   phase shift means for changing the phase of the read data pulses or the write data pulses by an amount determined in accordance with the desired amount of read window shifting or write precompensation, respectively, wherein the phase shift means is integral to both the reading and writing means; and
   means for selecting between read operation and write operation.

11. An integrated system for implementation of read window shifting function for read operation and write precompensation function for write operation in a disk storage device, comprising:
   write precompensation means for performing write precompensation function by phase-shifting write information during write operation;
   read window shifting means for performing read window shifting function by phase shifting read information during read operation, wherein the write precompensation means and the read window shifting means share a same hardware for phase shifting the read and write informations for the respective read window shifting and write precompensation functions; and
   means for selecting between read operation and write operation.

12. A method for performing read window shifting and write precompensation functions during read and write operations, respectively, in a disk storage device comprising the steps of:
   providing a phase shifting circuit;
   selecting between read and write operations, wherein read data is directed to the phase shifting circuit during the read operation and write data is directed to the phase shifting means during the write operation; and
   phase shifting the read data during the read operation using the phase shifting circuit or phase shifting the write data during the write operation using the same phase shifting circuit.

* * * * *